United States Patent [19]

Aprigliano

[11] Patent Number: 4,639,399
[45] Date of Patent: Jan. 27, 1987

[54] NICKEL OXIDE, CERAMIC INSULATED, HIGH TEMPERATURE COATING

[75] Inventor: Louis F. Aprigliano, Riva, Md.

[73] Assignee: The United States of America as represented by the Secretary of the Navy, Washington, D.C.

[21] Appl. No.: 801,895

[22] Filed: Nov. 26, 1985

[51] Int. Cl.⁴ .................... F01D 5/28; B32B 15/04
[52] U.S. Cl. .................... 428/623; 428/632; 428/937; 416/241 B
[58] Field of Search ............ 428/623, 937, 632, 633, 428/678, 622; 416/241 B

[56] References Cited

U.S. PATENT DOCUMENTS

| | | | |
|---|---|---|---|
| Re. 31,339 | 9/1983 | Dardi et al. | 428/678 |
| 3,415,631 | 12/1968 | Ault et al. | 428/937 |
| 3,481,715 | 12/1969 | Whalen et al. | 428/937 |
| 3,718,962 | 3/1973 | Levine | 29/195 |
| 3,721,534 | 3/1973 | Kubick | 428/632 |
| 3,864,093 | 2/1975 | Wolfla | 29/195 |
| 4,080,486 | 3/1978 | Walker et al. | 428/678 |
| 4,269,903 | 5/1981 | Clingman et al. | 428/623 |
| 4,321,310 | 3/1982 | Ulion et al. | 428/632 |
| 4,328,285 | 5/1982 | Siemers et al. | 428/633 |
| 4,399,199 | 8/1983 | McGill et al. | 428/639 |
| 4,429,019 | 1/1984 | Schrewelius | 416/241 R |
| 4,495,907 | 1/1985 | Kamo | 428/633 |
| 4,576,874 | 3/1986 | Spengler et al. | 428/623 |

FOREIGN PATENT DOCUMENTS 656503 8/1951 United Kingdom ............ 416/241 B

OTHER PUBLICATIONS

Quets and Dresher, Thermochemistry of the Hot Corrosion of Superalloys—Journal of Materials, JMLSA, vol. 4, No. 3, 1969, pp. 583–599.

Primary Examiner—L. Dewayne Rutledge
Assistant Examiner—John J. Zimmerman
Attorney, Agent, or Firm—Luther A. Marsh

[57] ABSTRACT

A three layer composite coating for gas turbine engine materials and other materials exposed to high temperatures, thermal cycling, and corrosive environments. The base layer is Aluminide or an MCrAlY composite, where M is a metal selected from the group consisting of nickel or cobalt, alone or in combination. The middle layer is a ceramic composite. The outer layer is composed of nickel oxide.

18 Claims, 1 Drawing Figure

NICKEL OXIDE, CERAMIC INSULATED, HIGH TEMPERATURE COATING

BACKGROUND OF THE INVENTION

1. Field of the Invention

The present invention relates generally to protective coatings, and more particularly to a corrosion, oxidation, and high temperature resistant layered coating for gas turbine engine materials.

2. Description of the Prior Art

Gas turbine engines operate under extreme conditions of temperature, pressure, and environment, and therefore have a high rate of degradation. Peak operating temperatures typically reach between 1,000 and 2,000 degrees Fahrenheit. These high temperatures cause the surfaces of turbine engine materials to oxidize and degrade. Thermal cycling, the rapid temperature changes during start up and shut down, causes further oxidation, cracking and flaking of the surface, and degradation of engine materials. In addition, gas turbine engines often operate in corrosive environments, such as ocean based naval operations. At the high temperatures and pressures experienced in gas turbine engines, salts from these environments become molten and highly corrosive. The gas turbine blades and vanes are particularly susceptible to high temperature, corrosion, and degradation from these molten salts. Gas turbine engines must therefore be constantly monitored and maintained, replacing expensive parts which have degraded.

Various protective ccatings are known for reducing degradation in high temperatures and corrosive environments. Aluminide coatings, (a nickel, cobalt, aluminum intermetallic compound) MCrAlY coatings (where M is a metal such as nickel or cobalt alone or in combination), and ceramic thermal barrier coatings, alone or in combination, are currently used to protect gas turbine blades and vanes from exposure to these operating conditions.

Nickel oxide coatings have also been previously studied and found to provide excellent protection from molten salts in a high temperature environment. However, if contaminated with other elements such as aluminum or chromium, a nickel oxide coating will rapidly degrade in a high temperature, corrosive environment. The combination of a nickel oxide coating with a substrate or metallic alloy containing these elements has therefore previously not been available, as some contamination is an unavoidable consequence of applying or forming a nickel oxide to such substrates or metal alloys. In addition, the thermal expansion of the substrate materials currently used in gas turbine blades and vanes is substantially greater than the thermal expansion of nickel oxide. A nickel oxide coating will therefore crack and flake off when applied to such metallic alloy substrates.

For these and other reasons. presently known high temperature and corrosion resistant coatings for metallic alloys have not included a nickel oxide and MCrAlY combination. A need exists for a protective coating for turbine engine parts having improved high temperature and corrosion resistance.

SUMMARY OF THE INVENTION

It is therefore an object of the present invention to reduce the degradation of turbine engine materials exposed to high temperature.

A further object of the present invention is to reduce the degradation of turbine engine materials exposed to a corrosive environment.

Another object of the present invention is to reduce the degradation of turbine engine materials from thermal cycling.

Still another object of the present invention is to reduce the amount of maintenance required on gas turbine engines.

Yet another object of the present invention is to combine the protective qualities of a nickel oxide coating and an MCrAlY coating.

These objects and further advantages are achieved by the present invention, a three layer protective coating having a base layer of MCrAlY, a ceramic middle layer, and a nickel oxide outer layer.

BRIEF DESCRIPTION OF THE DRAWING

A more complete appreciation of the invention will become apparent from the following detailed description when considered in conjunction with the accompanying drawing, wherein.

DETAILED DESCRIPTION OF THE PREFERRED EMBODIMENT

Figure 1:
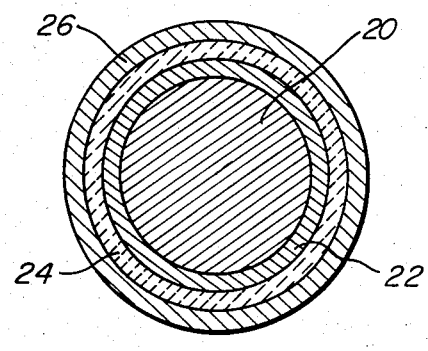
FIG. 1 is a cross-sectional view of a substrate having the protective coating of the present invention.

Referring now to FIG. 1, the protective coating of the present invention is illustrated in a cross-sectional view. A substrate material 20 is protectively coated, said coating comprising an MCrAlY layer 22, a ceramic layer 24, and a nickel oxide layer 26.

The substrate material 20 is generally a metallic alloy, such as the nickel based alloy, Rene-80, or the cobalt based alloy, X-40. Rene-80 and X-40 are produced commercially by the General Electric Corporation. These materials are commonly used as a substrate for gas turbine engine hot section blades and vanes.

The substrate material 20 is first coated with an MCrAlY layer 22, where M is a metal such as nickel or cobalt, alone or in combination, Cr is chromium, Al is aluminum, and Y is yttrium. The chemical composition by weight is generally in the range of: 20% to 40% Cr; 5% to 15% Al; 0% to 1% Y; and the balance being M. The preferred chemical composition, by weight, is about 25% Cr; 10% Al; 0.3% Y; and, the balance being cobalt. The preferred thickness of the MCrAlY layer 22 is in the range of one to five mils.

The MCrAlY layer 22 bonds a ceramic layer 24 to the substrate material 20. The ceramic layer 24 may be permeable to oxygen, or other gasses, but is impermeable to the metallic components of the substrate 20 and the MCrAlY layer 22. This insures that any subsequently applied layers will not be contaminated by the metallic elements of the substrate material 20 or the MCrAlY layer 22.

The ceramic layer 24 also provides a thermal expansion buffer for the nickel oxide layer 26. A thermal expansion gradient exists from the interior, metallic alloy substrate 20, to the exterior, nickel oxide layer 26; the metallic substrate 20 has the greatest thermal expansion coefficient, then the MCrAlY layer 22, then the ceramic layer 24, and finally the nickel oxide layer 26 has the smallest thermal expansion coefficient. The ceramic layer reduces the surface tension which would otherwise exist between an interfacing metallic alloy material and a nickel oxide coating, thereby substantially reducing cracking and flaking of the nickel oxide protective layer.

The preferred ceramic layer 24 is composed of zirconia stabilized by an additive selected from the group consisting of yttria, magnesia, calcia, and alumina. One example is an 8 mole % Yttria, with the balance being zirconia. Numerous alternative ceramic composition layers may be used, including, but not limited to, silicon nitride and silicon carbide. The thickness of the ceramic layer 24 is generally in the range of one to fifteen mils, preferably in the range of two to seven mils.

The nickel oxide layer 26 is applied to the ceramic layer 24. The preferred composition, by weight, is: 78% Ni; and, 22% O. The thickness of the nickel oxide layer 26 is in the range of one tenth of one mil to ten mils, preferably in the range of one tenth of one mil to two mils.

Each layer of the protective coating may be applied using known methods, including but not limited to, physical vapor deposition, chemical vapor deposition, plasma spraying, and sputtering. The preferred method of applying the MCrAlY layer and ceramic layer is by plasma spraying. The preferred method of applying the nickel oxide layer is by sputtering, which provides a dense and thick coating.

Numerous modifications and variations of the present invention are possible in light of the above teachings. One alternative would be to substitute an aluminide layer for the MCrAlY layer 22. It is therefore to be understood that within the scope of the appended claims, the invention may be practiced otherwise than as specifically described herein.

I claim:

1. A corrosion, oxidation, and heat resistant layered coating for a substrate material in a high temperature, corrosive environment, consisting of:
   a base layer selected from the group consisting of Aluminide and MCrAlY, wherein M is a metal selected from the group consisting of nickel, cobalt, and a combination thereof;
   a ceramic layer, impermeable to the metallic elements of said substrate material and said MCrAlY layer, and bonded to said substrate material by said MCrAlY layer; and,
   a nickel oxide layer, applied to said ceramic layer.

2. A corrosion, oxidation, and heat resistant layered coating as recited in claim 1, wherein said base layer is an MCrAlY, and wherein the chemical composition by weight of said MCrAlY layer is in the range of: 20% to 40% Cr; 5% to 15% Al; 0% to 1% Y; and the balance being M.

3. A corrosion, oxidation, and heat resistant layered coating as recited in claim 1, wherein said base layer is an MCrAlY, and wherein the chemical composition by weight of said MCrAlY layer is about 25% Cr, 10% Al, 0.3% Y, and, the balance being cobalt.

4. A corrosion, oxidation, and heat resistant layered coating as recited in claim 1, wherein said base layer is an MCrAlY, and wherein the thickness of said MCrAlY layer is in the range of one to five mils.

5. A corrosion, oxidation and heat resistant layered coating as recited in claim 1, wherein said ceramic layer consists essentially of zirconia, stabilized by an additive selected from the group consisting of yttria, magnesia, calcia, and alumina.

6. A corrosion, oxidation, and heat resistant layered coating as recited in claim 1, wherein said ceramic layer consists essentially of zirconia stabilized by alumina.

7. A corrosion, oxidation and heat resistant layered coating as recited in claim 1, wherein said ceramic layer consists essentially of zirconia stabilized by magnesia.

8. A corrosion, oxidation, and heat resistant layered coating as recited in claim 1, wherein said ceramic layer consists essentially of zirconia stabilized by calcia.

9. A corrosion, oxidation, and heat resistant layered coating as recited in claim 1, wherein said ceramic layer consists essentially of zirconia stabilized by yttria.

10. A corrosion, oxidation and heat resistant layered coating as recited in claim 9, wherein said ceramic layer consists essentially of an 8 mole % Yttria composition.

11. A corrosion, oxidation, and heat resistant layered coating as recited in claim 1, wherein said ceramic layer consists essentially of silicon nitride.

12. A corrosion, oxidation, and heat resistant layered coating as recited in claim 1, wherein said ceramic layer consists essentially of silicon carbide.

13. A corrosion, oxidation, and heat resistant layered coating as recited in claim 1, wherein the thickness of said ceramic layer in in the range of one to fifteen mils.

14. A corrosion, oxidation, and heat resistant layered coating as recited in claim 1, wherein the thickness of said ceramic layer is in the range of two to seven mils.

15. A corrosion, oxidation, and heat resistant layered coating as recited in claim 1, wherein the thickness of said nickel oxide layer is in the range of one tenth of one mil to ten mils.

16. A corrosion, oxidation, and heat resistant layered coating as recited in claim 1, wherein the thickness of said nickel oxide layer is in the range of one tenth of one mil to two mils.

17. A corrosion, oxidation, and heat resistant layered coating as recited in claim 1, wherein said base layer is aluminide.

18. A corrosion, oxidation, and heat resistant layered coating as recited in claim 17, wherein the thickness of said aluminide layer is in the range of one to five mils.

* * * * *